Patented July 22, 1947

2,424,402

UNITED STATES PATENT OFFICE 2,424,402

FROTH FLOTATION OF SULFIDE ORES WITH PHOSPHOROUS - SULFIDE - OLEFIN REACTION PRODUCT

Clarence M. Loane and James W. Gaynor, Hammond, Ind., assignors to Standard Oil Company, Chicago, Ill., a corporation of Indiana No Drawing. Application September 14, 1944, Serial No. 554,151

21 Claims. (Cl. 209—166)

This invention relates to the separation of minerals and the concentration of ores by flotation processes and is particularly directed to the separation and concentration of sulfide ores utilizing as flotation agents or collectors certain phosphorus- and sulfur-containing reagents.

According to the present invention the separation of minerals and the concentration of ores, particularly sulfide ores, by means of the flotation processes is carried out with the aid of certain phosphorus sulfide-hydrocarbon reaction products of the type hereinafter described.

The flotation agent or collector employed in accordance with the present invention is the reaction product of a hydrocarbon with a phosphorus sulfide, such as $P_2S_3$, $P_4S_3$, $P_4S_7$ or $P_2S_5$ and preferably the latter. The hydrocarbon constituent of this reaction is preferably a mono-olefin hydrocarbon polymer resulting from the polymerization of low molecular weight mono-olefinic hydrocarbons or isomono-olefinic hydrocarbons such as propylenes, butylenes and amylenes or the copolymers obtained by the polymerization of hydrocarbon mixtures containing isomono-olefins and mono-olefins of less than about 6 carbon atoms. These polymers may be obtained by the polymerization of olefins or mixtures of olefins of the type described in the presence of a catalyst such as sulfuric acid, phosphoric acid, and boron fluoride, aluminum chloride or other similar halide catalysts of the Friedel-Crafts type. While we prefer to employ a mono-olefin hydrocarbon polymer as the hydrocarbon reactant, it is to be understood other hydrocarbons hereinafter described can be suitably employed.

The polymers employed are preferably mono-olefin polymers or mixtures of mon-olefin polymers and isomono-olefin polymers having molecular weights ranging from about 112 to about 50,000 or more, and preferably from about 112 to about 1,000. Such polymers can be obtained, for example, by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts type such as, for example, boron fluoride, aluminum chloride and the like. In the preparation of these polymers we may employ, for example, a hydrocarbon mixture containing isobutylene, butylenes and butanes recovered from petroleum gases especially those gases produced in the cracking of petroleum oils in the manufacture of gasoline.

A suitable polymer for the reaction with phosphorus sulfide is the product obtained by polymerizing in the liquid phase a hydrocarbon mixture containing butylene and isobutylenes together with butanes and some $C_3$ and $C_5$ hydrocarbons at a temperature between about 0° F. and 30° F. in the presence of aluminum chloride. A suitable method for carrying out the polymerization is to introduce the aluminum chloride into the reactor and introduce the hydrocarbon mixture cooled to a temperature of about 0° F. into the bottom of the reactor and passing it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity.

Another suitable polymer is that obtained by polymerizing in the liquid phase a hydrocarbon mixture comprising substantially $C_3$ hydrocarbons in the presence of an aluminum chloride complex catalyst. The catalyst is preferably prepared by heating aluminum chloride with isooctane. The temperature in the reactor is controlled within the range of about 50° F. to about 110° F. The hydrocarbon mixture is introduced into the bottom of the reactor and passed upwardly through the catalyst layer. The propane and other saturated gases pass through the catalyst, while the propylene is polymerized under these conditions. The propylene polymer can be fractionated to the desired molecular weight.

Other suitable polymers can be obtained by polymerizing a hydrocarbon mixture containing about 10% to about 25% isobutylene at a temperature of from about 0° F. to about 100° F. and preferably 0° F. to about 32° F. in the presence of boron fluoride. After the polymerization of the isobutylene together with a relatively minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to viscous, oily material and contains polymers having molecular weights ranging from about 100 to about 2,000 or higher. The polymers so obtained may be used as such, or the polymer may be fractionated under reduced pressure into fractions of increasing molecular weights, and suitable fractions obtained reacted with the phosphorus sulfide to obtain the desired reaction products. The bottom resulting from the fractionation of the polymer which may have Saybolt Universal viscosities at 210° F. ranging from about 50 seconds to about 10,000 seconds, are well suited for the purpose of the present invention.

Another source of an olefinic polymer suitable for the herein intended purpose is a fraction of the polymer obtained in the treatment of a gaseous hydrocarbon mixture containing isobutylene and normal butylene in the presence of a phosphoric acid catalyst in the synthesis of isooctane. The polymer may be obtained by subjecting a gas mixture comprising less than $C_5$ hydrocarbons and containing $C_4$ olefins and paraffins to temperatures of about 270° F. to about 430° F., preferably about 300° F. to about 330° F., and at a pressure of from about 500 pounds per square inch to about 750 pounds per square inch and preferably about 600 pounds per square inch in the presence of a catalyst such as phosphoric acid on kieselguhr, diatomaceous earth or the like. The mixed polymer obtained comprises essentially a dimer, but contains in addition about 5–10% and usually 6–7% of heavy polymer comprising trimer, tetramer and still higher polymers.

Examples of high molecular weight olefinic hydrocarbons which can be employed as reactants are cetene, ($C_{16}$), cerotene ($C_{26}$), melene ($C_{30}$) and mixed high molecular weight alkenes obtained by cracking petroleum oils.

Other preferred olefins suitable for the preparation of the herein-described phosphorus sulfide reaction products are olefins having at least 20 carbon atoms in the molecule of which from about 13 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

The olefins obtained by dehalogenation of long chain alkyl halides are preferably those obtained by dehalogenation of mono-halogenated waxes, such as, for example, those obtained by dechlorination of monochlor paraffin wax. The alkyl halides are decomposed to yield olefins according to the reaction $$C_nH_{2n+1}X \rightarrow C_nH_{2n} + HX$$

in which $n$ is a whole number, preferably 20 or more, and X is an halogen. It is preferred to employ paraffin waxes having at least about 20 carbon atoms per molecule, and melting points upwards from about 90° F. to about 140° F.

To obtain the halogenated paraffin wax, for example, chlorinated paraffin wax, chlorine is introduced into the wax, maintained in a molten state, until the wax has a chlorine content of from about 8% to about 15%. The chlorinated wax product is a mixture of unchlorinated wax, monochlor wax and polychlor wax. This chlorinated product may be used as such, but it is advantageous to use the substantially monochlor wax fraction. The monochlor wax fraction can be segregated from the unchlorinated wax and the polychlor wax fractions by taking advantage of the differences in the melting points of the various fractions, since the melting point of the wax varies with the extent of chlorination; i. e., the melting point of the unchlorinated wax is greater than that of the monochlor wax, and the melting point of the latter is greater than that of the polychlor wax. Thus, the monochlor paraffin wax can be separated from the unchlorinated and the polychlor wax fractions by means such as sweating, fractional distillation, solvent extraction, solvent precipitation, and fractional crystallization.

The high molecular weight olefins are obtained by removing the halogen as hydrogen halide from the halogenated paraffin wax. For example, the corresponding olefin is obtained from the monochlor paraffin wax by removing the chlorine from the latter as hydrogen chloride. The monochlor wax can be dechlorinated by heating to a temperature of from about 200° F. to about 600° F. in the presence of a dechlorinating agent such as an alkali metal hydroxide or an alkaline earth metal hydroxide or oxide. Other alkaline inorganic or organic materials can also be used. The chlorine can also be removed from the chlorowax by heating the same for a prolonged period in the absence of any dechlorinating agent. After the dehalogenation has been completed the olefin so obtained can be further purified by removing the dehalogenating agent by means of filtration or by other suitable means.

As a starting material there can be used the polymer or synthetic lubricating oil obtained by polymerizing unsaturated hydrocarbons resulting from the vapor phase cracking of paraffin waxes in the presence of aluminum chloride which is fully described in United States Patents Nos. 1,995,260, 1,970,002, and 2,091,398. Still another type of olefin polymer which may be employed is the polymer resulting from the treatment of vapor phase cracked gasoline and/or gasoline fractions with sulfuric acid or solid absorbents such as fuller's earth whereby unsaturated polymerized hydrocarbons are removed. Also contemplated within the scope of this invention is the treatment with phosphorus sulfide of the polymers resulting from the voltolization of hydrocarbons as described, for example, in United States Patents Nos. 2,197,768 and 2,191,787.

The phosphorus sulfide-hydrocarbon reaction product can be readily obtained by reacting a phosphorus sulfide, for example $P_2S_5$, with the hydrocarbon at a temperature of from about 200° F. to about 500° F. and preferably from about 200° F. to about 400° F., using from about 1% to about 75% and preferably from about 10% to about 50% of the phosphorus sulfide in the reaction. It is advantageous to maintain a non-oxidizing atmosphere such as, for example, an atmosphere of nitrogen above the reaction mixture. Usually it is preferable to use an amount of the phosphorus sulfide that will completely react with the hydrocarbon so that no further purification becomes necessary; however, an excess amount of phosphorus sulfide can be used and separated from the product by filtration or by dilution with a solvent such as hexane, filtering and subsequently removing the solvent by suitable means such as by distillation. If desired the reaction product can be further treated with an agent having an active hydrogen atom such as steam at an elevated temperature of from about 100° F. to about 600° F.

The reaction of the phosphorus sulfide and the hydrocarbon can be carried out in the presence of a sulfurization agent such as elemental sulfur or a sulfur halide such as a sulfur chloride. In this modification the hydrocarbon constituent of the reaction can be sulfurized prior to the reaction with the phosphorus sulfide or the sulfurization can be accomplished subsequent to the reaction of the hydrocarbon with the phosphorus sulfide, although we prefer to carry out the sulfurization simultaneously with the phosphorus sulfide-hydrocarbon reaction. When the sulfurization takes place prior to or subsequent to the reaction with the phosphorus sulfide, it can be accomplished by treating the hydrocarbon or the phosphorus sulfide-hydrocarbon reaction product with elemental sulfur at a temperature of from about 250° F. to about 450° F. and preferably at a temperature of from about 350° F. to about 375° F. When a sulfur halide is employed as the sulfurization agent, the sulfurization reaction can be carried out at a somewhat lower temperature.

The phosphorus sulfide-hydrocarbon reaction products of the type above described can be suitably employed as agents or collectors in the flotation process. However, we prefer to employ the neutralized phosphorus sulfide-hydrocarbon reaction product. These phosphorus sulfide-hydrocarbon reaction products normally show a titratable acidity which is neutralized by treatment with a basic reagent. The phosphorus sulfide-hydrocarbon reaction product when neutralized with a basic reagent containing a metal constituent is characterized by the presence or retention of the metal constituent of the basic reagent. Other metal constituents such as polyvalent or heavy metal constituents can be incorporated in the neutralized product by reacting the same with a salt of the desired heavy metal. The term "neutralized phosphorus sulfide-hydrocarbon reaction product" as used herein and in the appended claims means a phosphorus sulfide-hydrocarcon reaction product having at least about 1% of its titratable acidity neutralized by the reaction with a basic reagent and includes the neutralized phosphorus sulfide-hydrocarbon reaction product containing a metal constituent resulting from said neutralization or resulting from the reaction of a heavy metal salt with the neutralized phosphorus sulfide-hydrocarbon reaction product.

The neutralized phosphorus sulfide-hydrocarbon reaction product can be obtained by treating the phosphorus sulfide-hydrocarbon reaction product with a suitable basic compound such as an hydroxide, carbonate or an oxide of an alkaline earth metal or an alkali metal such as, for example, potassium hydroxide or sodium hydroxide, or with a basic metallic sulfide or polysulfide, preferably an alkali metal sulfide or an alkaline earth metal sulfide, such as, for example, sodium sulfide, sodium polysulfide, potassium sulfide, calcium sulfide, etc. Other basic reagents can be used such as, for example, ammonium sulfide, ammonia or an alkyl or aryl substitute of ammonia such as amines. The neutralization of the phosphorus sulfide-hydrocarbon reaction product is carried out preferably in a non-oxidizing atmosphere by contacting the reaction product either as such or dissolved in a suitable solvent such as naphtha with a solution of the basic reagent, for example, potassium hydroxide or sodium hydroxide dissolved in alcohol. As an alternative method, the reaction product can be treated with solid alkaline compounds such as KOH, NaOH, $Na_2CO_3$, $K_2CO_3$, CaO, and the like at an elevated temperature of from about 100° F. to about 600° F. As was aforesaid, when the phosphorus sulfide-hydrocarbon reaction product is neutralized with a basic reagent containing a metal constituent, the neutralized reaction product is characterized by the presence of the metal constituent of the basic reagent. Neutralized reaction products containing a heavy metal constituent such as, for example, tin, titanium, aluminum, chromium, cobalt, zinc, iron, and the like, can be obtained by reacting a salt of the desired heavy metal with the phosphorus sulfide-hydrocarbon reaction product which has been treated with a basic reagent. It will be understood that when the neutralization is accomplished with a polyvalent basic material such as lime, a product having excess basicity may be obtained.

The methods of preparing various types of phosphorus sulfide-hydrocarbon reaction products are illustrated by the following specific examples which are given merely by way of illustration and are not intended to limit the scope of the invention:

Example I

To 700 grams of an isobutylene polymer having a molecular weight of about 1000 were added 233 grams of $P_2S_5$ and 14 grams of sulfur and the mixture heated to a temperature of 400° F. and maintained at said temperature for 5 hours while being blown with nitrogen. The reaction mass was then diluted with 50% of a mineral oil having a viscosity corresponding to that of an S. A. E. 20 mineral oil. The diluted mixture was then neutralized at 400° F. with 103 grams of sodium sulfide. The neutralized product was then filtered through Celite.

Example II

An isobutylene polymer having a Saybolt Universal viscosity at 210° F. of about 3000 seconds was heated with 10% of phosphorus pentasulfide at a temperature of about 380° F. for eight hours. The reaction product so obtained was cooled, 3% of KOH was added, and the mixture was heated at 180° F. for two hours. At the end of the two hour period the temperature was raised to 340–350° F. and maintained within this temperature range for three hours. This product showed the following analysis:

| | Percent |
|---|---|
| Phosphorus | 3.04 |
| Sulfur | 3.97 |
| Potassium | 2.1 |

The above product was diluted with an equal volume of an S. A. E. 20 motor oil and steam blown for three and one-half hours at temperatures of from 340–350° F.

Example III

An olefin polymer having a Saybolt Universal viscosity at 210° F. of 83 seconds, prepared by polymerizing a mixture of butylenes and isobutylene in the presence of boron fluoride, was sulfurized with 10% sulfur for 72 hours at a temperature of 341° F. Air was bubbled through the reactants at a rate of 10 liters per hour to promote oxidation and to insure intimate contact of the sulfur and the polymer. The final reaction product was diluted with two volumes of hexane, settled at 10° F. for 20 hours, filtered to remove unreacted sulfur and the hexane subsequently removed from the filtrate by evaporation on a steam bath. The sulfurized product contained 6.16% sulfur.

This sulfurized polymer oil was then reacted with 10% $P_2S_5$ for 6 hours at a temperature of 370 to 380° F. during which time nitrogen was bubbled through the reaction mixture. This reaction product was then neutralized with 9% solid KOH at a temperature of 370° F. to 380° F. and then blown with nitrogen for an additional two hours within the same temperature range. The neutralized product had a phosphorus content of 2.09%, a sulfur content of 3.75% and a potassium content of 5.89%. The product after being blown with steam for about four hours at a temperature of from 360° F. to 370° F. had a sulfur content of about 1.7% and a phosphorus and potassium content substantially the same as above.

Example IV

An isobutylene polymer, having a Saybolt Universal viscosity at 210° F. of about 3,000 seconds, obtained by polymerizing in the presence of boron fluoride a hydrocarbon mixture containing from about 10% to about 25% isobutylene was reacted simultaneously with 10% phosphorus pentasulfide and 3% sulfur for five hours at 370° F. to 380° F. and then blown for an additional three hours with nitrogen within the same temperature range. This product had a phosphorus content of 2.6% and a sulfur content of 6%.

Example V

A portion of the above product of Example IV was neutralized with 6% solid potassium hydroxide at a temperature of 350° F. to 360° F. The neutralization was carried out over a three hour period while blowing nitrogen through the reactants. The neutralized product has a phosphorus content of 2.6%, a sulfur content of 3.6%, and a potassium content of 3%.

It is not to be implied that all of the herein-described compounds are equivalent in their effectiveness. While the specific activity of each of the compounds varies to some extent, all of them, however, are effective flotation agents or collectors for the intended purpose. The amount of flotation collector required to be used in the flotation process will vary depending upon the character and the composition of the ore, upon the particular flotation collector employed, and upon various other variable factors of the flotation process. However, usually from about 0.01 to about 5 pounds of the flotation collector per ton of dry ore can be employed. These quantities are in no way limiting, however, and greater or smaller amounts can be used if desired.

The effectiveness of these compounds as flotation collectors is demonstrated by the following experiment in which a neutralized phosphorus sulfide-olefin polymer reaction product is compared with a well-known flotation collector which is purported to be a xanthate of higher alcohols:

*Sample description.*—500 grams of minus 100-mesh quartz and minus 65-mesh pyrite; pyrite content 10 per cent of total.

*Sample treatment.*—Ground 5 minutes in Abbe pebble mill at 50 per cent solids.

*Flotation procedure.*—Ground sample added to 500-gram Fagergren cell; pH of pulp 5.1 after dilution.

*Reagent collector.*—(A) Neutralized reaction product of Example I above added in two stages of 0.05 pound per ton, equivalent to a total of 0.05 pound per ton of active ingredient; (B) Xanthate of higher alcohol added in one stage of 0.05 pound per ton.

*Frother.*—A high boiling branch chain alcohol added in the amount of 0.05 pound per ton. Froth collected until barren.

Metallurgical results

| Collector | Wt., Per Cent | | Fe, Per Cent | | Fe Distribution, Per Cent | |
|---|---|---|---|---|---|---|
| | Conc. | Tailing | Conc. | Tailing | Conc. | Tailing |
| A | 10.1 | 89.9 | 42.6 | 1.0 | 82.7 | 17.3 |
| B | 9.3 | 90.7 | 45.2 | 1.2 | 79.7 | 20.3 |

The flotation collectors of the type herein-described can suitably be used in conjunction with frothing agents, such as an organic compound containing an hydroxyl group such as, for example, pine oil, cresol and the like. Other frothing agents such as organic compounds containing carbonyl, carboxyl and amide groups can also be used. In addition to frothing agents, depressants can also be employed.

While we have described our invention in connection with certain specific embodiments thereof, it is to be understood that these are only by way of illustration and are not intended to limit the scope of the invention except in so far as defined by the appended claims.

We claim:

1. The method of effecting the concentration of a sulfide ore by flotation which comprises subjecting a mineral pulp containing a sulfide ore to a flotation operation in the presence of the phosphorus and sulfur-containing reaction product of a phosphorus sulfide and an olefin.

2. The method of claim 1 in which the phosphorus and sulfur-containing reaction product of a phosphorus sulfide and an olefin is used in combination with a frothing agent.

3. The method of effecting the concentration of a sulfide ore by flotation which comprises subjecting a mineral pulp containing a sulfide ore to a flotation operation in the presence of the phosphorus and sulfur-containing reaction product of $P_2S_5$ and an olefin.

4. The method of effecting the concentration of a sulfide ore by flotation which comprises subjecting a mineral pulp containing a sulfide ore to a flotation operation in the presence of the phosphorous and sulfur-containing reaction product of a phosphorus sulfide and an olefin polymer.

5. The method of claim 4 in which the phosphorus and sulfur-containing reaction product of a phosphorus sulfide and an olefin polymer is used in conjunction with a frothing agent.

6. The method of effecting the concentration of a sulfide ore by flotation which comprises subjecting a mineral pulp containing a sulfide ore to a flotation operation in the presence of the phosphorous and sulfur-containing reaction product of a phosphorus sulfide and a mono-olefin polymer.

7. The method of claim 6 in which the phosphorus and sulfur-containing reaction product of the phosphorus sulfide and a mono-olefin polymer is used in conjunction with a frothing agent.

8. The method of effecting the concentration of a sulfide ore by flotation which comprises subjecting a mineral pulp containing a sulfide ore to a flotation operation in the presence of the phosphorous and sulfur-containing reaction product of a phosphorus sulfide and a butylene polymer.

9. The method of effecting the concentration of a sulfide ore by flotation which comprises subjecting a mineral pulp containing a sulfide ore to a flotation operation in the presence of the phosphorous and sulfur-containing reaction product of a phosphorus sulfide and a propylene polymer.

10. The method of effecting the concentration of a sulfide ore by flotation which comprises subjecting a mineral pulp containing a sulfide ore to a flotation operation in the presence of the neutralized phosphorous and sulfur-containing reaction product of a phosphorus sulfide and an olefin hydrocarbon.

11. The method of claim 10 in which the neutralized phosphorus and sulfur-containing reaction product of a phosphorus sulfide and an olefin hydrocarbon is used in conjunction with a frothing agent.

12. The method of effecting the concentration of a sulfide ore by flotation which comprises subjecting a mineral pulp containing a sulfide ore to a flotation operation in the presence of the neutralized phosphorous and sulfur-containing reaction product of a phosphorus sulfide and a mono-olefin hydrocarbon polymer.

13. The method of claim 12 in which the neutralized phosphorus and sulfur-containing reaction product of a phosphorus sulfide and a mono-olefin hydrocarbon polymer is used in conjunction with a frothing agent.

14. The method of effecting the concentration of a sulfide ore by flotation which comprises subjecting a mineral pulp containing a sulfide ore to a flotation operation in the presence of the neutralized phosphorous and sulfur-containing reaction product of a phosphorus sulfide and isobutylene polymer.

15. The method of effecting the concentration of a sulfide ore by flotation which comprises subjecting a mineral pulp containing a sulfide ore to a flotation operation in the presence of the neutralized phosphorous and sulfur-containing reaction product of a phosphorus sulfide and a propylene polymer.

16. The method of effecting the concentration of a sulfide ore by flotation which comprises subjecting a mineral pulp containing a sulfide ore to a flotation operation in the presence of a phosphorus- and sulfur-containing product obtained by the process comprising reacting an olefin with a sulfurizing agent and a phosphorus sulfide, and subsequently reacting the product so obtained with a basic reagent.

17. The method of claim 16 in which a frothing agent is used in conjunction with the phosphorus and sulfur-containing reaction product.

18. The method described in claim 16 in which the olefin is an olefin polymer and the phosphorus sulfide is phosphorus pentasulfide.

19. The method of effecting the concentration of a sulfide ore by flotation which comprises subjecting a mineral pulp containing a sulfide ore to a flotation operation in the presence of a phosphorus- and sulfur-containing product obtained by reacting an olefin with a sulfurizing agent and a phosphorus sulfide, and subsequently reacting the product so obtained with a metal sulfide.

20. The method described in claim 19 in which the metal sulfide is an alkali metal sulfide.

21. The method described in claim 19 in which the metal sulfide is sodium sulfide.

CLARENCE M. LOANE.
JAMES W. GAYNOR.

REFERENCES CITED

The following references are of record in the file of this patent:

UNITED STATES PATENTS

| Number | Name | Date |
|---|---|---|
| 1,772,386 | Derby | June 17, 1927 |
| 1,949,956 | Derby | Mar. 6, 1934 |
| 1,839,155 | Lubs | Dec. 29, 1931 |
| 2,351,763 | Hull | June 20, 1944 |
| 2,316,086 | MacLaren | Apr. 6, 1943 |
| 1,904,460 | Moses | Apr. 18, 1933 |
| 2,125,337 | Gaudin | Aug. 2, 1938 |